(12) United States Patent
Koh et al.

(10) Patent No.: US 10,947,469 B2
(45) Date of Patent: Mar. 16, 2021

(54) APPARATUS AND METHOD FOR MANUFACTURING BIO EMULSION FUEL USING VEGETABLE OIL

(71) Applicants: James Chun Koh, Fort Lee, NJ (US); Shinji Hasegawa, Tokyo (JP)

(72) Inventors: James Chun Koh, Fort Lee, NJ (US); Shinji Hasegawa, Tokyo (JP)

(*) Notice: Subject to any disclaimer, the term of this patent is extended or adjusted under 35 U.S.C. 154(b) by 17 days.

(21) Appl. No.: 16/411,112

(22) Filed: May 13, 2019

(65) Prior Publication Data
US 2020/0362256 A1 Nov. 19, 2020

(51) Int. Cl.
| C10L 1/32 | (2006.01) |
| B01D 21/01 | (2006.01) |
| B01D 21/26 | (2006.01) |
| B01F 3/08 | (2006.01) |
| B01F 5/06 | (2006.01) |
| B01F 15/00 | (2006.01) |
| B01F 15/04 | (2006.01) |
| B01J 19/24 | (2006.01) |

(52) U.S. Cl.
CPC .............. *C10L 1/328* (2013.01); *B01D 21/01* (2013.01); *B01D 21/262* (2013.01); *B01F 3/0807* (2013.01); *B01F 5/064* (2013.01); *B01F 15/00149* (2013.01); *B01F 15/00162* (2013.01); *B01F 15/00422* (2013.01); *B01F 15/0429* (2013.01); *B01J 19/245* (2013.01); *B01F 2215/0088* (2013.01); *B01J 2219/00162* (2013.01); *B01J 2219/00164* (2013.01); *B01J 2219/00186* (2013.01); *C10L 2200/0484* (2013.01); *C10L 2290/22* (2013.01); *C10L 2290/24* (2013.01)

(58) Field of Classification Search
CPC .............. C10L 1/328; C10L 2200/0484; C10L 2290/24; C10L 2290/22; B01D 21/01; B01D 21/262; B01F 15/00162; B01F 15/00149; B01F 15/00422; B01F 15/0429; B01F 3/0807; B01F 5/064; B01F 2215/0088; B01J 19/245; B01J 2219/00186; B01J 2219/00164; B01J 2219/00162
See application file for complete search history.

(56) References Cited

U.S. PATENT DOCUMENTS

| 2012/0240875 | A1 | 9/2012 | Tan | |
| 2014/0223808 | A1* | 8/2014 | Hasegawa | C10G 35/095 44/457 |
| 2014/0305028 | A1* | 10/2014 | Koh | B01J 4/002 44/301 |

FOREIGN PATENT DOCUMENTS

JP 2011-038000 A 2/2011

* cited by examiner

*Primary Examiner* — Cephia D Toomer
(74) *Attorney, Agent, or Firm* — Leepi

(57) ABSTRACT

A bio emulsion fuel manufacturing apparatus and method using vegetable oil is provided, including an oil tank unit configured to refine a vegetable oil introduced from an oil inlet by using a coagulant agent and a centrifugal decanter; a water tank unit configured to pretreat a water introduced from a water inlet by using a water tank catalyst; a mixed oil unit connected to the oil tank unit and the water tank unit, and configured to produce a mixed oil by using an inline mixer; and an ionization catalyst unit connected to the mixed oil unit and configured to convert the mixed oil to a bio emulsion fuel by using an ionization catalyst group.

11 Claims, 8 Drawing Sheets

APPARATUS AND METHOD FOR MANUFACTURING BIO EMULSION FUEL USING VEGETABLE OIL

FIELD OF THE INVENTION

The various embodiments described herein pertain generally to an apparatus and method for manufacturing bio emulsion fuel using vegetable oil.

BACKGROUND OF THE INVENTION

Recently, exhaustion of fossil fuel and generation of greenhouse gases have arisen as worldwide problems.

In order to solve the problems, Korean Patent No. 101328151 (titled "Fuel Manufacturing Method"), which was filed by the present inventor, describes a method and apparatus for manufacturing an emersion fuel that can be atomized and exhibits high applicability and high stability. In this method and apparatus, water and an oil fuel such as diesel, kerosene or heavy oil are supplied into a space to which a magnetic field is applied. In that space, the water and the oil fuel are atomized and mixed with each other, so that an emersion fuel is produced.

In such a conventional fuel manufacturing method and apparatus, however, since the fuel is in the form of emersion, water-oil separation may occur and a water component may be left. As a consequence, a flash point would be greatly increased, whereas a calorific power would be decreased, resulting in a failure to reduce the consumption of the fossil fuel greatly.

In an attempt to solve the problem, the present inventor has filed Korean Patent No. 101581235 (titled "Apparatus for Manufacturing a Reformed Fuel and a Method for Manufacturing the Same"). In this method and apparatus, water is atomized by applying an ultrasonic wave or an electric field to a water tank, and hydrogen peroxide is decomposed by supplying enzyme from an enzyme tank. Accordingly, water and oil are allowed to be easily mixed with each other without separated. Thus, it is possible to suppress the aforementioned problems of the reformed fuel in the form of emersion, such as an increase of a flash point and a decrease of a calorific power.

However, this conventional apparatus and method for manufacturing a reformed fuel involves a complicated process, and there is difficulty in managing enzyme in the enzyme tank. Further, since the apparatus has a complicated structure adapted to apply the ultrasonic wave and the electric field, manufacturing cost is high and repair and maintenance of the apparatus is not easy Also, in the process of producing and selling the actual system, there is a realistic problem that it is difficult to make a catalyst corresponding to the different additives added to the fuel in each country.

SUMMARY

In view of the foregoing problems, example embodiments provide an apparatus and method for manufacturing bio emulsion fuel using vegetable oil instead of using fossil fuel containing different additives in each country.

In accordance with a first aspect of an illustrative embodiment, there is provided a bio emulsion fuel manufacturing apparatus including an oil tank unit configured to refine a vegetable oil introduced from an oil inlet by using a coagulant agent and a centrifugal decanter; a water tank unit configured to pretreat a water introduced from a water inlet by using a water tank catalyst; a mixed oil unit connected to the oil tank unit and the water tank unit, and configured to produce a mixed oil by using an inline mixer; and an ionization catalyst unit connected to the mixed oil unit and configured to convert the mixed oil to a bio emulsion fuel by using an ionization catalyst group.

In accordance with a second aspect of the illustrative embodiment, there is provided a bio emulsion fuel manufacturing method including, preparing a refined oil by solidifying impurities from a vegetable oil with a coagulant agent and separating solidified impurities by a centrifugal decanter; preparing a pretreated water by pretreating water supplied in a water tank by a water tank catalyst; producing a mixed oil from the refined oil introduced from the oil tank and the pretreated water introduced from the water tank by passing them through a inline mixer; and converting, in an ionization catalyst unit, the mixed oil introduced from the mixed oil tank to a bio emulsion fuel by using an ionization catalyst group.

According to the above-mentioned problem solving method of the present invention, the bio emulsion fuel using vegetable oil generates heat higher in combustion than that of the emulsion fuel by the conventional fossil fuel.

Also, the bio emulsion fuel using vegetable oil has a reduced pollutant emission due to its characteristics of emulsion fuel.

Bio-emulsion fuel using vegetable oil has the advantage of significantly lowering production cost compared to emulsion fuel using fossil fuel by securing an abundant supplying source of vegetable oil.

BRIEF DESCRIPTION OF THE DRAWINGS

In the detailed description that follows, embodiments are described as illustrations only since various changes and modifications will become apparent from the following detailed description. The use of the same reference numbers in different figures indicates similar or identical items.

FIG. 1 is divided into FIG. 1(*a*), FIG. 1(*b*) and FIG. 1(*c*) to display detailed entities.

DETAILED DESCRIPTION

Figure 1A:
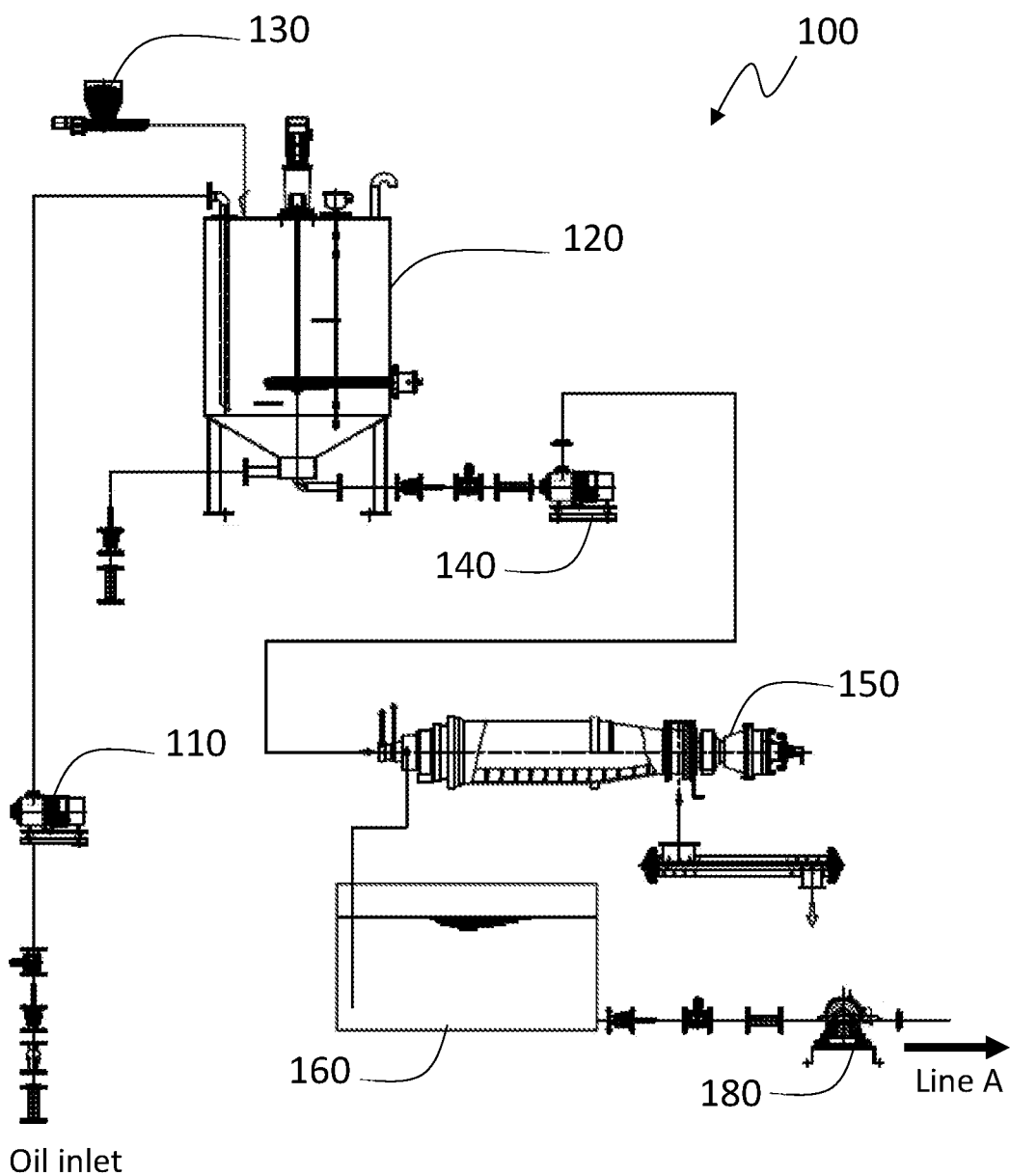
FIG. 1 is a process flowchart of the bio emulsion fuel manufacturing apparatus in accordance with an example embodiment to explain how the bio emulsion fuel is produced through the present invention.

Hereinafter, example embodiments will be described in detail so that inventive concept may be readily implemented by those skilled in the art. However, it is to be noted that the present disclosure is not limited to the illustrative embodiments and examples but can be realized in various other ways. In drawings, parts not directly relevant to the description are omitted to enhance the clarity of the drawings, and like reference numerals denote like parts through the whole document.

Through the whole document, the term "on" that is used to designate a position of one element with respect to another element includes both a case that the one element is adjacent to the another element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise. The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Hereinafter, example embodiments will be described in detail with reference to the accompanying drawings, which form a part hereof.

First, a bio emulsion fuel manufacturing apparatus 10 (hereinafter, referred to as "the present bio emulsion fuel manufacturing apparatus 10") in accordance with an example embodiment will be elaborated.

Referring to FIG. 1(a), (b), and (c), a configuration of the present bio emulsion fuel manufacturing apparatus 10 will be explained.

As depicted in FIG. 1, the present bio emulsion fuel manufacturing apparatus 10 includes an oil tank unit 100, a water tank unit 200, a mixed oil unit 300 and an ionization catalyst unit 400.

The oil tank unit 100 may be supplied with vegetable oil through an oil supplying pump 110. The provided oil is temporarily stored in an oil tank 120. The oil itself provided by a supplier typically contains many kinds of impurities that deteriorate the performance of an engine or generator during combustion process therein. To eliminate impurities contained in the oil, the oil tank unit 100 may include a coagulant feeder 130 configured to provide a coagulant agent into the oil tank 120, then the coagulant agent solidifies the impurities in the oil. The oil inside the oil tank 120 is transferred to a centrifugal decanter 150 through an oil transfer pump 140. The centrifugal decanter 150 internally rotates in high speed to generate centrifugal force onto the oil to separate solidified impurities from the oil. The refined oil by the centrifugal decanter 150 is temporarily sent and stored in an oil collecting tank 160, then transferred to a refined oil tank 170 through a refined oil transfer pump 180.

The water tank unit 200 is configured to pretreat water introduced therein by using a water tank catalyst. The water tank unit 200 may be supplied with water from a water supplying pump 210.

The mixed oil unit 300 is connected to the oil tank unit 100 and the water tank unit 200. The mixed oil unit 300 generates a mixed oil, configured to physically mix the refined oil transferred from the oil tank unit 100 and the pretreated water from the water tank unit 200 by using an inline mixer 360.

More specifically, the refined oil inside the refined oil tank 170 is transferred to the inline mixer 360 through a high pressure oil pump 310. Also, the pretreated water inside the water tank 220 is transferred to the inline mixer 360 simultaneously through a high pressure water pump 320. Each conduit line between tanks 170, 220 and inline mixer 360 includes a control valve 330a, 330b configured to control the amount of oil and water that goes into the inline mixer 360 respectively. The mixture ratio of the refined oil and the pretreated water is determined by the adjustment of the control valve 330a, 330b. The preferred ratio between the refined oil and the pretreated water is normally set to 1:1, but could be 6:4 or 7:3 based on the operating condition. In addition, each conduit line between tanks 170, 220 and inline mixer 360 further includes a pressure gage 340a, 340b and a flow gage 350a, 350b to monitor the pressure and flow rate of each refined oil and pretreated water that goes into the inline mixer 360. The data from the pressure gage 340a, 340b and the flow gage 350a, 350b are sent to a main controller (not shown in the FIGS) to automatically adjust the ratio in a precise way.

The mixed oil physically mixed by the inline mixer 360 is transferred to a mixed oil tank 370 and temporarily stored therein.

The ionization catalyst unit 400 is connected to the mixed oil unit 300. The ionization catalyst unit 400 is configured to generate a bio emulsion fuel as a final product from the mixed oil by using an ionization catalyst group.

Figure 2:
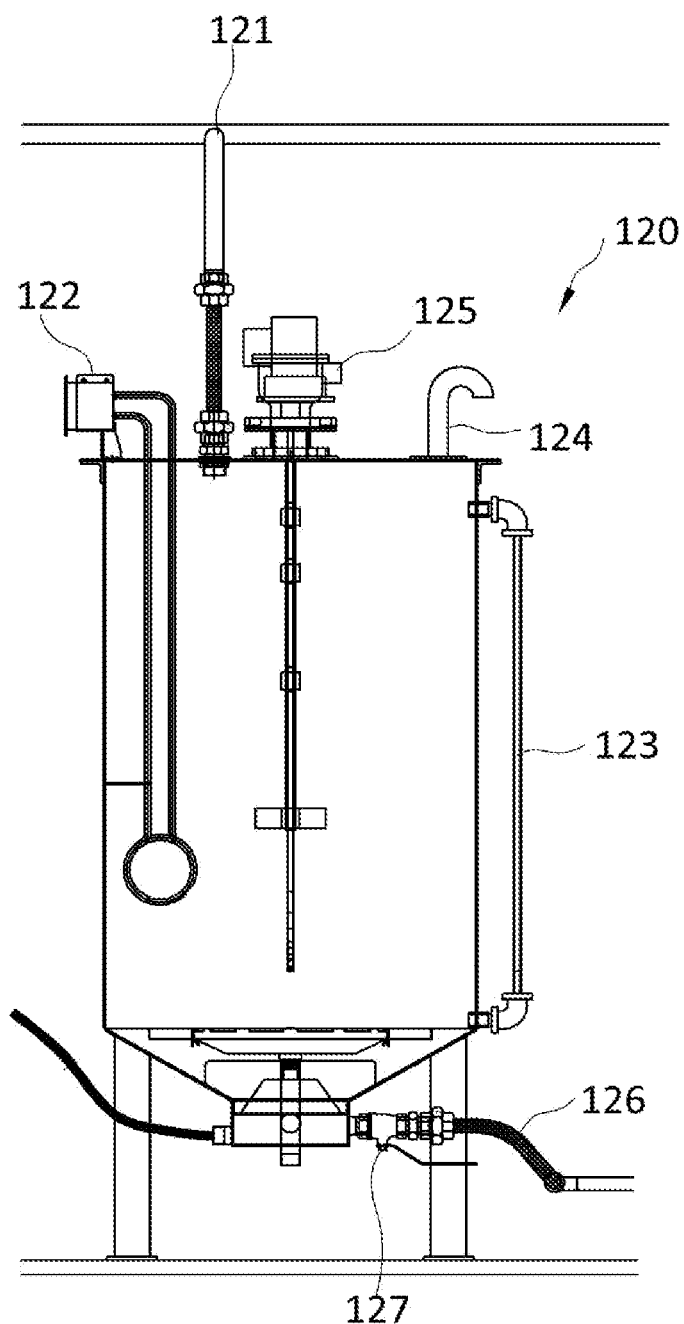
FIG. 2 is a schematic side view of an oil tank in accordance with the example embodiment.

Referring to FIG. 2, the oil tank 120 in accordance with the example embodiment will be elaborated in further detail.

The oil tank 120 includes an oil inlet line 121, an oil heater 122, an oil level measurer 123, an air vent 124, an oil agitator 125, and an oil outlet line 126.

The oil inlet line 121 delivers oil from the outside into the oil tank 120 through the oil supplying pump 110.

The oil heater 122 is provided to maintain an ideal temperature for the coagulant agent fed by the coagulant feeder 130 effectively solidifies the impurities inside the oil. By way of non-limiting example, the ideal temperature inside the oil tank 120 may be, e.g., about 50° C.

The oil level measurer 123 is configured to measure an oil level within the oil tank 120.

The oil level information obtained by the oil level measurer 123 may be sent to the main controller (not shown). The main controller adjusts the oil level within the oil tank 120 by checking the oil level information and controlling operation of the oil supplying pump 110.

The air vent 124 is provided to prevent a pressure rise within the oil tank 120. The air vent 124 may be implemented by a pipe through which the air within the oil tank is exhausted.

The oil agitator 125 is configured to agitate the oil within the oil tank 120. By way of example, the oil agitator 125 may be an oil agitating motor, which may be installed at an upper central portion of the oil tank 120. As the oil inside the oil tank 120 is agitated by the oil agitator 125, the temperature distribution throughout the oil is constantly maintained.

The oil outlet line 126 transfers the oil containing solidified impurities by the coagulant agent into the centrifugal decanter 150. For example, the oil may be transferred into the oil outlet line 126 through an oil outlet control valve 127 provided at a lower portion of the oil tank 120.

The completion of the pretreatment of the oil may be determined by the main controller. Further, the main controller may also control the opening and closing of the oil outlet control valve 127.

Figure 3:
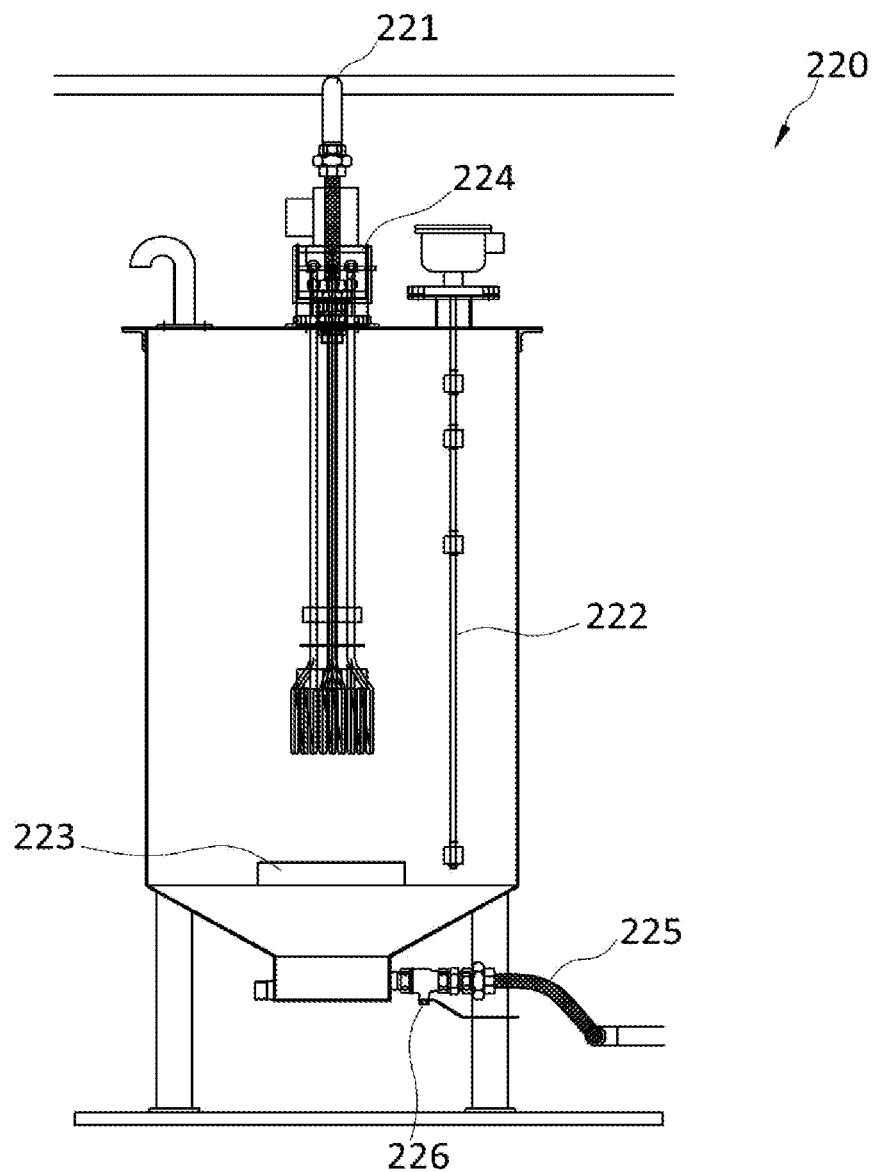
FIG. 3 is a schematic side view of a water tank in accordance with the example embodiment.

Referring to FIG. 3, the water tank 220 in accordance with the example embodiment will be elaborated in detail.

The water tank 220 includes a water inlet line 221, a water level measurer 222, a water tank catalyst cartridge 223, a water agitator 224, and a water outlet line 225.

The water inlet line 210 delivers water from the outside into the water tank 220 through a water supplying pump 210.

The water level measurer 222 is configured to measure a water amount, i.e., an water level within the water tank 220.

The water level information obtained by the water level measurer 222 may be sent to the main controller. The main controller adjusts the water level within the water tank 220 by checking the water level information and controlling an operation of the water supplying pump 210.

The water tank catalyst cartridge 223 stores a water tank catalyst therein. The water tank catalyst is brought into contact with the water, so that the pretreatment of the water is performed. By way of example, the water tank catalyst cartridge 223 may be provided at a central portion, e.g., a lower central portion within the water tank 220.

Here, the water tank catalyst may include a first water tank catalyst containing a tourmaline mineral such as tourmaline raw stone; and a second water tank catalyst containing at least one of silicon dioxide, a silicate mineral and a halogen mineral.

By way of example, the second water tank catalyst may be a spherical catalyst containing silicon dioxide, a silicate mineral and a halogen mineral, having a diameter of, but not limited to, about 1 cm.

The water within the water tank unit 100 may be turned into hydrogen water through the first water tank catalyst and the second water tank catalyst, and dissolved oxygen in the water may also be eliminated.

To be more specific, a tourmaline mineral has a piezoelectric effect and a pyroelectric effect. The tourmaline mineral also has an effect as an absorption polarizer, an electromagnetic radiation effect, a far infrared ray effect, an ionization effect, etc. Radiation of electromagnetic wave is begun as the tourmaline mineral is put into water. As the tourmaline mineral comes into contact with water molecules, coupling of the water molecules can be loosened. As described above, the pretreated water is produced by the contact between the water tank catalyst and the water in the water tank unit 100. A pH of the pretreated water may be about 7.5, and an ORP (Oxidation-Reduction Potential) may be maintained at about 90 to about 100.

The water agitator 224 is configured to agitate the water within the water tank 220. By way of non-limiting example, the water agitator 224 may be a water agitating motor, which is installed at an upper central portion of the water tank 220. As the water is agitated by the water agitator 224, the contact between the water and the water tank catalyst may be enhanced.

The water outlet line 225 delivers the pretreated water into the mixed oil unit 300 to be described later. For example, the pretreated water may be transferred into the water outlet line 225 through a water outlet control valve 226 provided at a lower portion of the water tank 220.

Completion of the pretreatment of the water may be determined by the main controller. Further, the main controller may also control the opening and closing of the water outlet control valve 226.

Figure 1B:
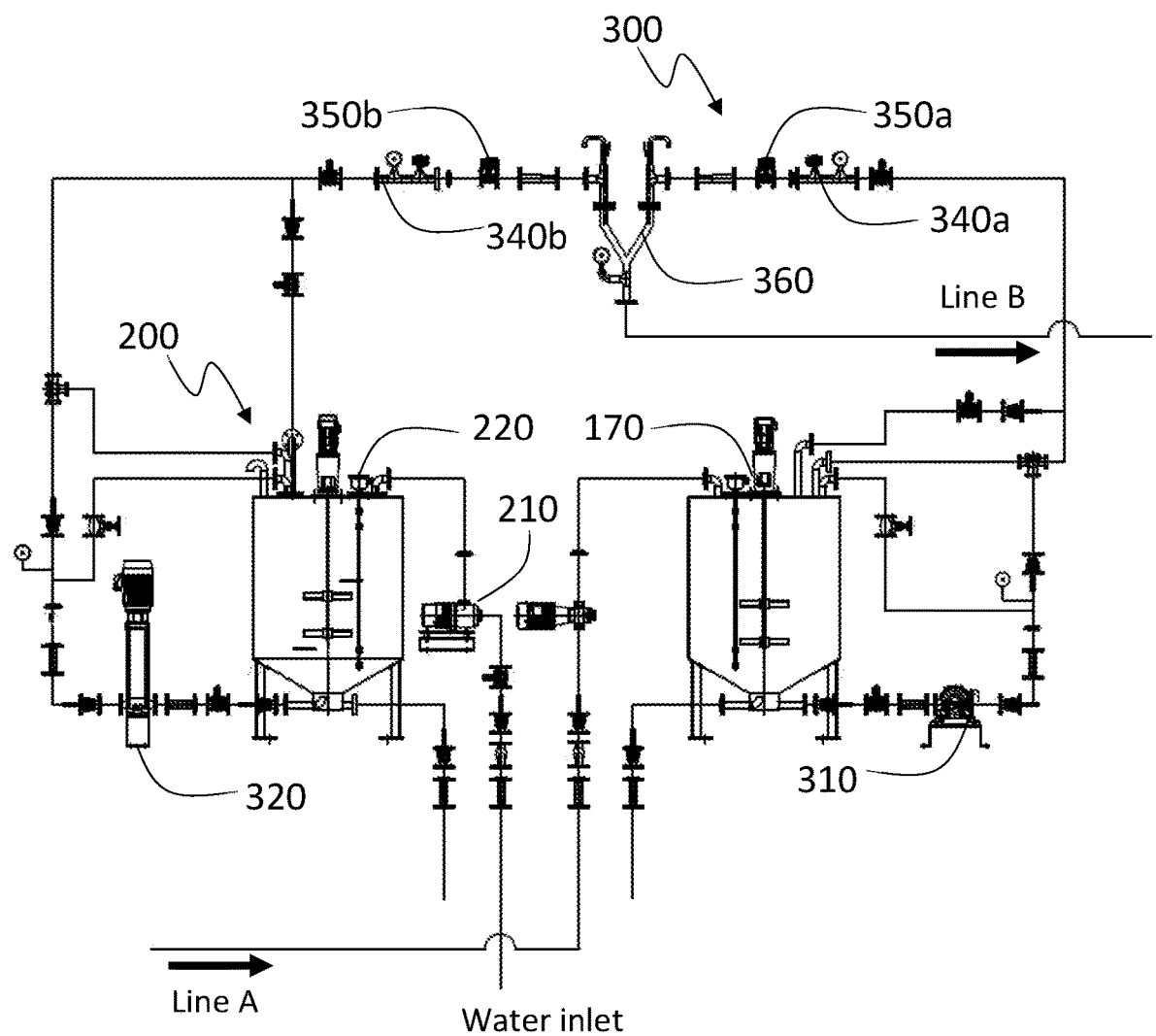

Referring to FIG. 1(b), a process of transferring the refined oil and the pretreated water into the mixed oil unit 300 and a process of mixing the refined oil and the pretreated water will be explained more in detail.

The refined oil by the decanter 150 is transferred and temporarily stored into the refined oil tank 170 through the refined oil pump 180. The refined oil in the refined oil tank 170 then is transferred to the inline mixer 360 in a pressurized way through the high pressure oil pump 310. The amount of the refined oil is determined by the control valve 330a. The refined oil passes through the pressure gage 340a and the flow gage 350a installed along the conduit line between the refined oil tank 170 and the inline mixer 360.

The pretreated water inside the water tank 220 is transferred to the inline mixer 360 in a pressurized way through the high pressure water pump 320. The amount of the pretreated water is determined by the control valve 330b. The pretreated water passes through the pressure gage 340b and the flow gage 350b installed along the conduit line between the water tank 220 and the inline mixer 360.

The pressure gage 340a, 340b and the flow gage 350a, 350b are respectively configured to measure a pressure flow rate of the water the refined oil and the pretreated water. The main controller may adjust a ratio between the refined oil and the pretreated oil through the use of a value or the like based on measurements of the pressure gage 340a, 340b and the flow gage 350a, 350b.

Desirably, a ratio between the refined oil and the pretreated water supplied into the inline mixer 360 may be about 1:1, but may be adjusted to 6:4 or 7:3 according to operating condition.

The inline mixer 360 is formed to Y shape. That is, the conduit line from the refined oil tank 170 and the conduit line from the water tank 220 is joined to the inline mix 360 as a single line. The inline mixer 360 may have a multiple number of protrusions on an inner surface thereof generating turbulence to the medium inside. The refined oil and the pretreated water that meet inside the inline mixer are physically mixed together effectively while they pass through.

Figure 4:
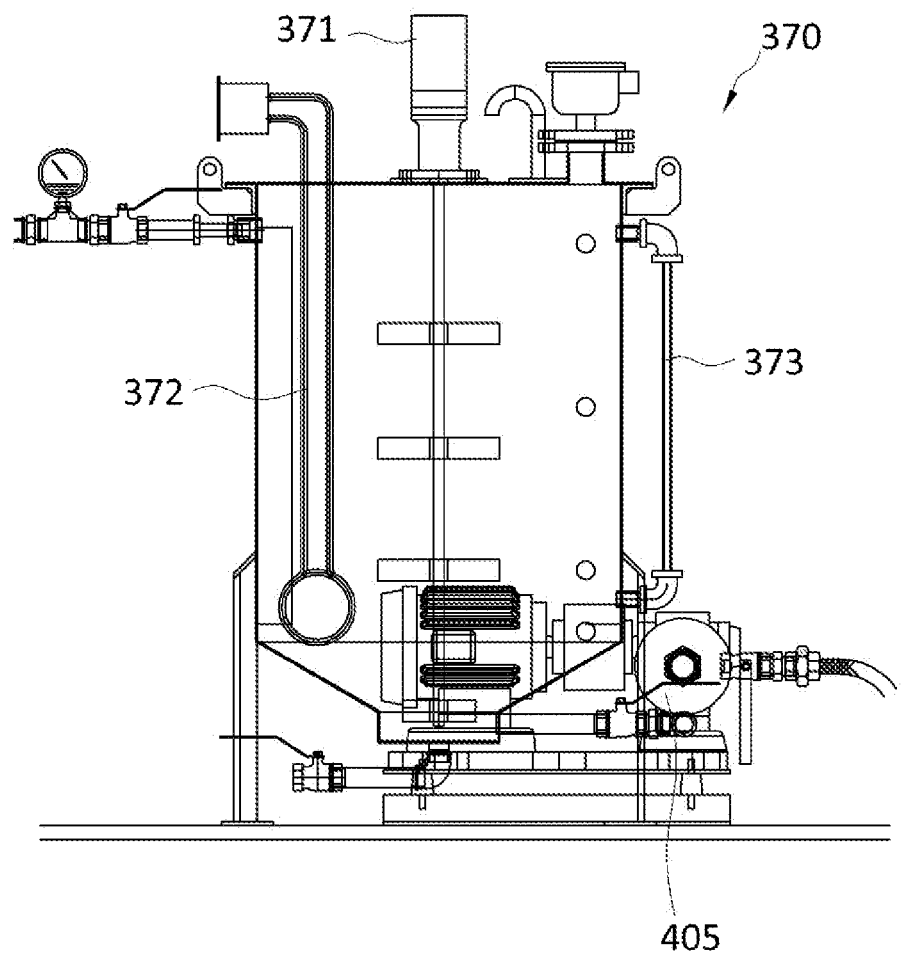
FIG. 4 is a schematic side view of a mixed oil tank in accordance with the example embodiment.

Referring to FIG. 4, the mixed oil tank 370 in accordance with the example embodiment will be described in detail.

The mixed oil tank 370 in accordance with the example embodiment is configured to store the mixed oil from the inline mixer 360.

For the purpose, the mixed oil tank 370 includes a mixed oil agitator 371, a mixed oil heater 372, and a mixed oil level measurer 373.

The mixed oil agitator 371 is configured to agitate the mixed oil introduced into the mixed oil tank 370 such that physically mixed status is maintained effectively. By way of example, the mixed oil agitator 371 may include a motor at an upper portion thereof; and a blade configured to mix the oil and the water. The blade may be rotated at, but not limited to, about 250 rpm to mix the oil and the water uniformly.

For example, the mixed oil may stay in the mixed oil tank 370 for about 5 minutes or less, during which the mixed oil may be more uniformly mixed by the agitating operation of the mixed oil agitator 371.

The mixed oil heater 372 may be configured to maintain a temperature of the mixed oil within a preset range to allow the constant temperature inside the mixed oil tank 370. Desirably, the temperature of the mixed oil may be maintained in the range from, e.g., about 25° C. to about 35° C.

The mixed oil level measurer 373 is configured to measure a level of the mixed oil. A measurement result of the mixed oil level measurer 373 is continuously monitored by the main controller. The main controller may control an inflow and an outflow of the mixed oil based on this measurement result.

Figure 5:
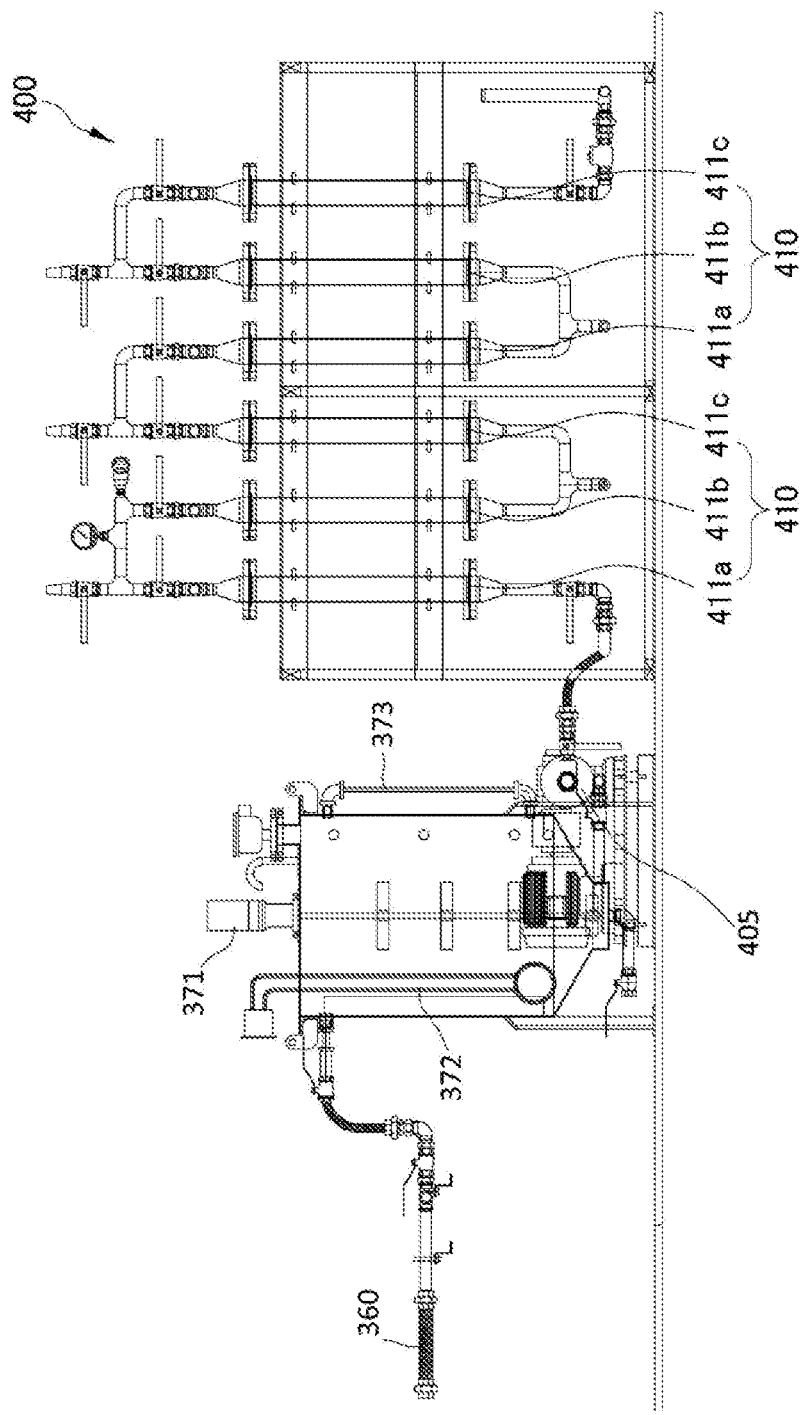
FIG. 5 is a schematic side view of an ionization catalyst unit with the example embodiment.

Referring to FIG. 5, the ionization catalyst unit 400 in accordance with the example embodiment will be described in detail.

A mixed oil pump 405 is configured to transfer the mixed oil in the mixed oil tank 370 to the ionization catalyst unit 400 to be described in detail below. For example, the mixed oil pump 405 may be configured to supply a regular amount of mixed oil to the ionization catalyst unit 400 continuously.

Further, the mixed oil pump 405 may be implemented by, but not limited to, a trochoid pump.

The ionization catalyst unit 400 may include one or more ionization catalyst group 410, and each ionization catalyst group 410 may include a multiplicity of ionization catalyst cartridge 411.

In a configuration where a plurality of ionization catalyst groups 410 is provided, these ionization catalyst groups 410 may be connected to each other in series or in parallel so as to allow the mixed oil to pass through an ionization catalyst repeatedly. For example, the ionization catalyst groups 410 may be connected in series or in combination of in series and in parallel.

Figure 1C:
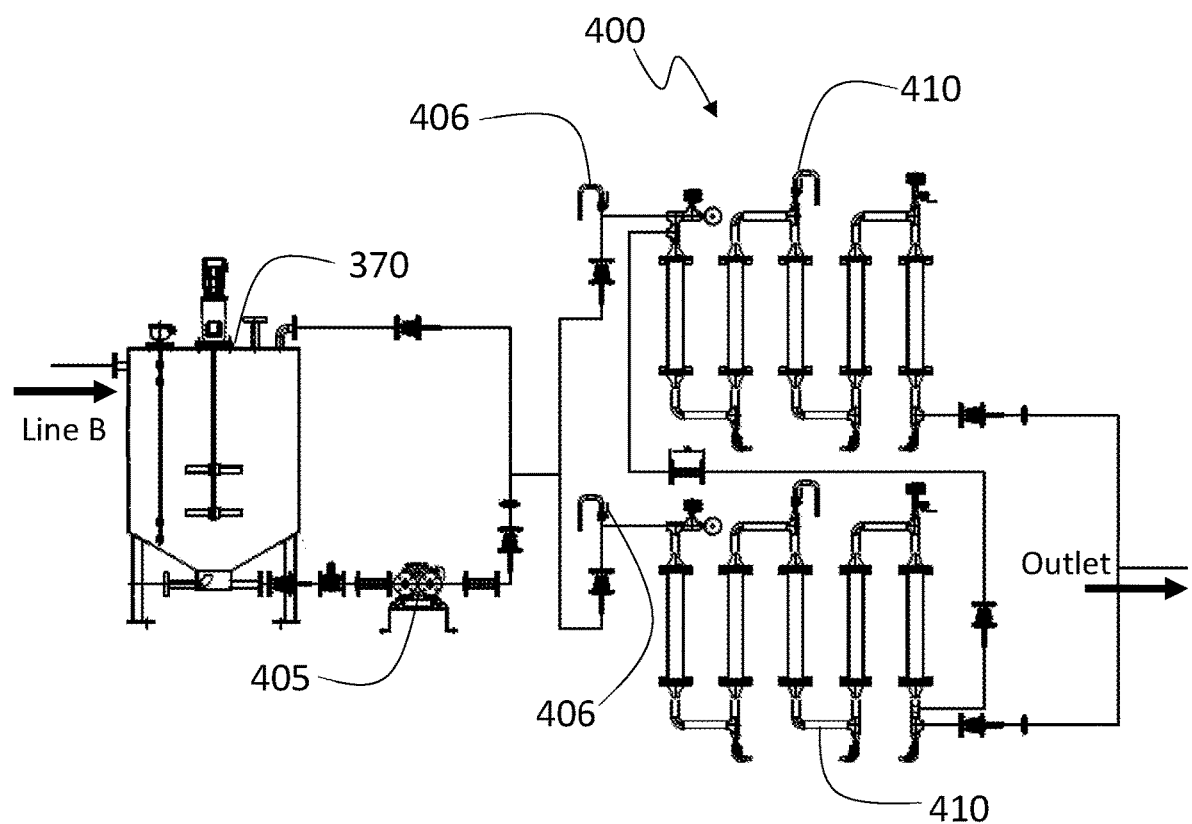

By way of example, referring to FIG. 1(c) and FIG. 5, twelve ionization catalyst cartridges 411 are connected in combination of in series and in parallel. To be more specific, four ionization catalyst groups 410, each of which has three ionization catalyst cartridges 411, may be provided. These four ionization catalyst groups 410 may be connected in combination of in series and in parallel, as depicted in FIG. 1(c).

As described above, as the plurality of ionization catalyst groups 410 are connected in series, the mixed oil is made to pass through the ionization catalyst groups 410 repeatedly by controlling an open-close control valve 406 installed at the front of the ionization catalyst groups 410.

In this manner, the mixed oil can be converted to the bio emulsion fuel with higher efficiency by passing through the ionization catalyst groups 410 multiple times.

Meanwhile, the ionization catalyst may include, but not limited to, alumina, silica gel, germanium, magnesia, magnesium, titanium oxide, Tomuro stone, zeolite, lithium ore and vanadium as main components. By way of example, the ionization catalyst cartridge 411 may be implemented in the form of a pipe charged with a spherical catalyst containing, but not limited to, alumina, silica gel, germanium, magnesia, magnesium, titanium oxide, Tomuro stone, zeolite, lithium ore and vanadium as main components. For example, a diameter of the spherical catalyst may be, e.g., about 1 cm.

The multiplicity of ionization catalyst cartridges 411 may be classified into three kinds depending on which catalyst material is added to the aforementioned main components of the ionization catalyst.

That is, the multiplicity of ionization catalyst cartridges 411 incorporated in each ionization may include a first ionization catalyst cartridge 411a, a second ionization catalyst cartridge 411b and a third ionization catalyst cartridge 411c.

By way of example, referring to FIG. 1(c) and FIG. 5, the ionization catalyst unit 400 may be comprised of four ionization catalyst groups 410 connected in combination of in series and in parallel, and each ionization catalyst group 410 includes three ionization catalyst cartridges 411a, 411b and 411c.

The mixed oil may be allowed to pass through the ionization catalyst group 410 in the order of the first ionization catalyst cartridge 411a, the second ionization catalyst cartridge 411b and then the third ionization catalyst cartridge 411c.

By way of example, referring to FIG. 5, the mixed oil may pass through the ionization catalyst groups 410 twice. That is, after the mixed oil may pass through a first ionization catalyst cartridge 411a, a second ionization catalyst cartridge 411 and a third ionization catalyst cartridge 411c of a first ionization catalyst group 410 in sequence, the mixed oil may then be made to pass through a first ionization catalyst cartridge 411a, a second ionization catalyst cartridge 411 and a third ionization catalyst cartridge 411c of a second ionization catalyst group 410 in sequence.

Further, the first ionization catalyst cartridge 411a serves to cause ionization of carbons included in the oil in the mixed oil. Through the ionization, adsorption of hydrogen in the water and the carbon in the oil can be facilitated.

An ionization catalyst accommodated in the first ionization catalyst cartridge 411a may be prepared by adding copper ions, silver ions, carbon ions and tourmaline to basic catalyst materials including alumina, silica gel, germanium, magnesia, magnesium, titanium oxide, Tomuro stone, zeolite, lithium ore and vanadium, and then by ceramizing the mixture. The ionization catalysts included in the first ionization catalyst cartridge 411a may be referred to as an ionizing catalyst.

The second ionization catalyst cartridge 411b serves to couple carbon components included in the oil in the mixed oil and hydrogen components in the water in the mixed oil. For example, the carbon components included in the oil in the mixed oil may be carbons ionized while passing through the first ionization catalyst cartridge 411a. Further, the hydrogen components included in the water in the mixed oil may be hydrogen ionized as the water in the water tank is pretreated as stated above.

An ionization catalyst accommodated in the second ionization catalyst cartridge 411a may be prepared by adding hydrogen ions, carbon ions and active oxygen species to the basic catalyst materials including alumina, silica gel, germanium, magnesia, magnesium, titanium oxide, Tomuro stone, zeolite, lithium ore and vanadium, and then by ceramizing the mixture. The ionization catalysts included in the second ionization catalyst cartridge 411b may be referred to as a hydrogenating catalyst.

The third ionization catalyst cartridge 411c serves to stabilize the mixed oil having passed through the first and second ionization catalyst cartridges 411a and 411b.

To stabilize the mixed oil, the third ionization catalyst cartridge 411c may serve to coat a molecular structure of the mixed oil obtained while the mixed oil passes through the second ionization catalyst cartridge 411b, thus allowing that molecular structure to be maintained.

An ionization catalyst accommodated in the third ionization catalyst cartridge 411c may be prepared by adding titanium powder to the basic catalyst materials including alumina, silica gel, germanium, magnesia, magnesium, titanium oxide, Tomuro stone, zeolite, lithium ore and vanadium, and then by ceramizing the mixture. The ionization catalysts included in the third ionization catalyst cartridge 411a may be referred to as a coating catalyst.

Finally, the mixed oil is converted to the bio emulsion fuel while it passes through the ionization catalyst unit 400 as described above.

Figure 6:
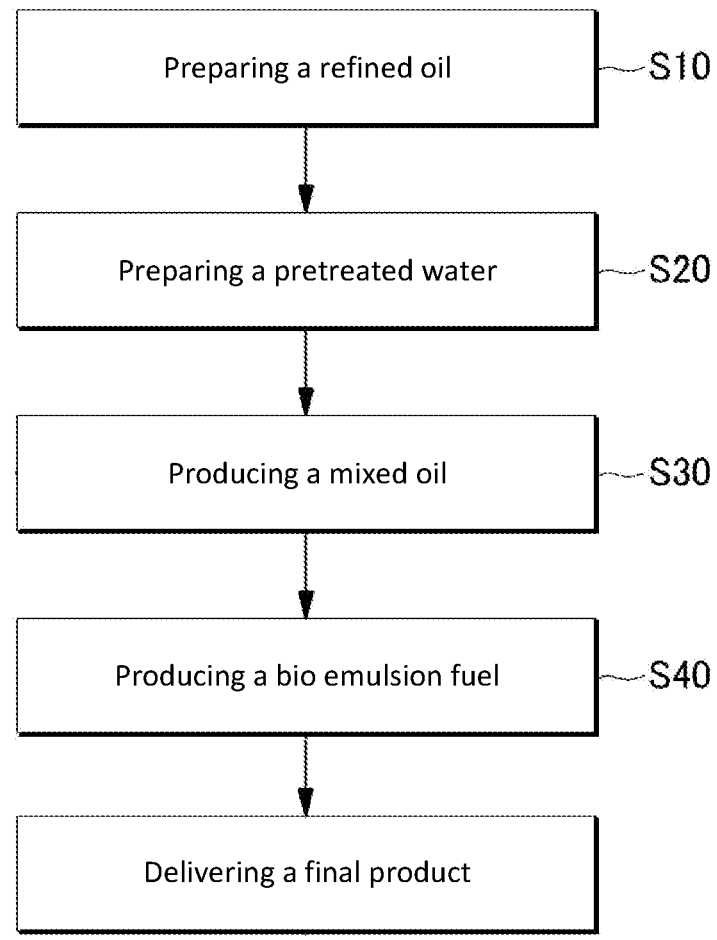
FIG. 6 is a flowchart for describing the bio emulsion fuel manufacturing method in accordance with the example embodiment.

Now, by referring FIG. 6, a method for manufacturing a bio emulsion fuel using vegetable oil in accordance with the present example embodiment (hereinafter, simply referred to as "the present bio emulsion fuel manufacturing method") will be elaborated. The present bio emulsion fuel manufacturing method is directed to producing the bio emulsion fuel by using the present bio emulsion fuel manufacturing apparatus as described above. Parts identical or similar to those described in the present reformed fuel manufacturing apparatus will be assigned same reference numerals, and redundant description will be simplified or omitted.

The present bio emulsion fuel manufacturing method includes block S10 for preparing a refined oil by separating the oil from impurities with a coagulant agent and a centrifugal decanter supplied into an oil tank unit 100.

The present reformed fuel manufacturing method further includes block S20 for preparing a pretreated water by pretreating water with a water tank catalyst supplied into a water tank unit 200.

At block S20, the water tank catalyst may include a first water tank catalyst containing tourmaline mineral; and a second water tank catalyst containing at least one of silicon dioxide, silicate mineral and halogen mineral. This is the same as that described in the bio emulsion fuel manufacturing apparatus, and, thus, detailed description thereof will be omitted.

Further, the present bio emulsion fuel manufacturing method includes block S30 for producing a mixed oil from the refined oil introduced from the oil tank unit 100 and the pretreated water introduced from the water tank unit 200 with an inline mixer supplied into a mixed oil unit 300.

Within the mixed oil unit 300, the refined oil and the pretreated water are further mixed with each other by being agitated in a mixed oil tank. Accordingly, the mixed oil can be uniformly maintained without being separated.

Further, the present bio emulsion fuel manufacturing method further includes a block S40 for converting the mixed oil from the mixed oil unit 300 to a bio emulsion fuel with an ionization catalyst supplied into an ionization catalyst unit 400.

As stated above, the ionization catalyst may be accommodated in the ionization catalyst unit 400. The ionization catalyst unit 400 may include one or more ionization catalyst groups 410, and each ionization catalyst group 410 may include the multiplicity of ionization catalyst cartridges 411. Since the ionization catalyst and the configuration/operation of the ionization catalyst unit 400 are already discussed in the description of the present bio emulsion fuel manufacturing apparatus, detailed description thereof will be omitted.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A bio emulsion fuel manufacturing apparatus using vegetable oil, comprising:
    an oil tank unit configured to refine and store an oil introduced therein;
    a water tank unit configured to pretreat a water introduced therein by using a water tank catalyst;
    a mixed oil unit connected to the oil tank unit and the water tank unit, and configured to produce a mixed oil by mixing a refined oil introduced from the oil tank unit and a pretreated water introduced from the water tank unit; and
    an ionization catalyst unit connected to the mixed oil unit and configured to convert the mixed oil, which is introduced from the mixed oil unit, to a bio emulsion fuel by using an ionization catalyst group;
    wherein the oil tank unit further includes,
    an oil supplying pump configured to introduce the oil therein;
    an oil tank configured to receive the oil through the oil supplying pump and store the oil temporarily;
    a coagulant feeder connected to the oil tank and configured to provide a coagulant agent into the oil tank and solidify impurities in the oil;
    an oil transfer pump configured to transfer the oil and solidified impurities inside the oil tank;
    a centrifugal decanter configured to receive the oil and solidified impurities from the oil transfer pump and generate the refined oil by separating solidified impurities from the oil;
    a refined oil transfer pump configured to transfer the refined oil from the centrifugal decanter; and,
    a refine oil tank configured to receive the refined oil through the refined oil transfer pump and store the refined oil temporarily.

2. The bio emulsion fuel manufacturing apparatus of claim 1,
    wherein the water tank catalyst further includes:
    a first oil tank catalyst containing a tourmaline mineral; and
    a second oil tank catalyst containing at least one of silicon dioxide, a silicate mineral and a halogen mineral.

3. The bio emulsion fuel manufacturing apparatus of claim 1,
    wherein the mixed oil unit further includes:
    a high pressure oil pump configured to transfer the refined oil introduced from the oil tank unit;
    a high pressure water pump configured to transfer the pretreated water introduced from the water tank unit;
    a inline mixer formed to Y shape and configured to receive the refined oil through the high pressure oil pump and the pretreated water through the high pressure water pump and generate the mixed oil; and
    a mixed oil tank configured to receive and store the mixed oil from the inline mixer temporarily.

4. The bio emulsion fuel manufacturing apparatus of claim 3,
    wherein, the refined oil passes through a control valve configured to adjust the amount of the refined oil flow, a pressure gage configured to measure the pressure therein, and a flow gage configured to measure the flow rate therein, all of which are installed along a conduit line between the refined oil tank and the inline mixer; and
    wherein, wherein, the pretreated water passes through a control valve configured to adjust the amount of the pretreated water flow, a pressure gage configured to measure the pressure therein, and a flow gage configured to measure the flow rate therein, all of which are installed along a conduit line between the water tank and the inline mixer.

5. The bio emulsion fuel manufacturing apparatus of claim 4,
    wherein, the inline mixer contains a multiple number of protrusions on an inner surface thereon to produce turbulence to the refined oil introduced from the refined oil tank and the pretreated water introduced form the water tank.

6. The bio emulsion fuel manufacturing apparatus of claim 4, wherein, a main controller adjusts a ratio between the refined oil and the pretreated oil through the use of a control value based on measurements of the pressure gage and the flow gage respectively.

7. The bio emulsion fuel manufacturing apparatus of claim 1,
wherein the ionization catalyst unit further includes:
a mixed oil pump configured to transfer the mixed oil;
one or more ionization catalyst groups configured to receive the mixed oil through the mixed oil pump;
wherein each of the one or more ionization catalyst group comprises a plurality of ionization catalyst cartridges; and
wherein each ionization catalyst cartridge accommodates therein an ionization catalyst.

8. The bio emulsion fuel manufacturing apparatus of claim 7,
wherein, the ionization catalyst groups are connected to each other in series or in combination of in series and in parallel for allowing the mixed oil to pass therethrough in sequence, and the number of catalyst groups are selected by an open-close control valve installed at the front of the each ionization catalyst group.

9. The bio emulsion fuel manufacturing apparatus of claim 8,
wherein each of the plurality of ionization catalyst cartridges comprises:
a first ionization catalyst cartridge configured to cause ionization of carbon contained in the oil in the mixed oil;
a second ionization catalyst cartridge configured to cause a carbon component contained in the oil in the mixed oil to be coupled to a hydrogen component contained in the water in the mixed oil; and
a third ionization catalyst cartridge configured to stabilize the mixed oil having passed through the first ionization catalyst cartridge and the second ionization catalyst cartridge.

10. The bio emulsion fuel manufacturing apparatus of claim 9,
wherein the mixed oil is allowed to pass through the first ionization catalyst cartridge, the second ionization catalyst cartridge and the third ionization catalyst cartridge in sequence.

11. The bio emulsion fuel manufacturing apparatus of claim 10,
wherein the ionization catalyst contains alumina, silica gel, germanium, magnesia, magnesium, titanium oxide, Tomuro stone, zeolite, lithium ore and vanadium as basic catalyst materials.

* * * * *